(12) United States Patent
Kim et al.

(10) Patent No.: US 8,815,454 B2
(45) Date of Patent: Aug. 26, 2014

(54) LITHIUM SECONDARY BATTERY

(75) Inventors: Yong-Shik Kim, Suwon-si (KR);
Jin-Bum Kim, Suwon-si (KR);
Jin-Sung Kim, Suwon-si (KR); Na-Rae Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 559 days.

(21) Appl. No.: 12/334,337

(22) Filed: Dec. 12, 2008

(65) Prior Publication Data

US 2009/0181301 A1 Jul. 16, 2009

(30) Foreign Application Priority Data

Dec. 14, 2007 (KR) ........................ 10-2007-0130804

(51) Int. Cl.
*H01M 6/18* (2006.01)

(52) U.S. Cl.
USPC ........ 429/339; 429/307; 429/231.8; 429/199; 429/200; 429/330; 429/231.95; 429/218.1; 429/225; 429/229; 429/231.6

(58) Field of Classification Search
CPC ............. H01M 6/168; H01M 10/052; H01M 10/0567; H01M 2300/0025
USPC .............. 429/339, 307, 231.8, 199, 200, 330, 429/231.95, 218.1, 225, 229, 231.6
See application file for complete search history.

(56) References Cited

U.S. PATENT DOCUMENTS

| | | | |
|---|---|---|---|
| 4,964,878 A | 10/1990 | Morris | |
| 5,418,682 A | 5/1995 | Warren, Jr. et al. | |
| 5,589,295 A | 12/1996 | Derzon et al. | |
| 6,482,547 B1 | 11/2002 | Yoon et al. | |
| 6,506,524 B1 | 1/2003 | McMillan et al. | |
| 6,743,947 B1 | 6/2004 | Xu et al. | |
| 7,335,446 B2 | 2/2008 | Chiga et al. | |
| 7,521,151 B2 | 4/2009 | Hwang et al. | |
| 7,622,222 B2 | 11/2009 | Chiga et al. | |
| 7,691,537 B2 | 4/2010 | Kim | |
| 7,718,311 B2 | 5/2010 | Yamaguchi et al. | |
| 7,718,322 B2 * | 5/2010 | Lee et al. | 429/339 |
| 7,776,475 B2 * | 8/2010 | Shimizu et al. | 429/339 |
| 2004/0013946 A1 | 1/2004 | Abe et al. | |
| 2004/0151981 A1 | 8/2004 | Spahr et al. | |
| 2004/0197667 A1 | 10/2004 | Noh et al. | |
| 2004/0201366 A1 | 10/2004 | Kimoto et al. | |
| 2004/0214092 A1 | 10/2004 | Noh et al. | |
| 2005/0031963 A1 | 2/2005 | Im et al. | |
| 2005/0069755 A1 | 3/2005 | Vernstrom et al. | |
| 2005/0069767 A1 | 3/2005 | Tsunekawa et al. | |
| 2005/0084765 A1 * | 4/2005 | Lee et al. | 429/330 |
| 2005/0208371 A1 | 9/2005 | Kim et al. | |
| 2005/0221168 A1 | 10/2005 | Dahn et al. | |
| 2006/0024584 A1 * | 2/2006 | Kim et al. | 429/326 |
| 2006/0035144 A1 * | 2/2006 | Shimizu et al. | 429/339 |
| 2006/0194118 A1 * | 8/2006 | Yew et al. | 429/200 |
| 2006/0204834 A1 * | 9/2006 | Kim et al. | 429/65 |
| 2006/0222937 A1 | 10/2006 | Morimoto et al. | |
| 2007/0009806 A1 | 1/2007 | Kim | |
| 2007/0231705 A1 | 10/2007 | Ohzuku et al. | |
| 2008/0057402 A1 | 3/2008 | Abe et al. | |
| 2008/0102369 A1 | 5/2008 | Sakata et al. | |
| 2008/0118846 A1 | 5/2008 | Lee et al. | |
| 2008/0118847 A1 | 5/2008 | Jung et al. | |
| 2008/0152998 A1 | 6/2008 | Murakami et al. | |
| 2008/0220336 A1 | 9/2008 | Mun et al. | |
| 2008/0248396 A1 | 10/2008 | Jung et al. | |
| 2008/0248397 A1 | 10/2008 | Jung et al. | |
| 2009/0047582 A1 | 2/2009 | Kim et al. | |
| 2009/0142663 A1 | 6/2009 | Takeuchi et al. | |
| 2009/0181301 A1 | 7/2009 | Kim et al. | |
| 2009/0253045 A1 | 10/2009 | Kotato et al. | |
| 2010/0167131 A1 | 7/2010 | Kim et al. | |
| 2010/0233549 A1 | 9/2010 | Kim et al. | |

FOREIGN PATENT DOCUMENTS

| | | |
|---|---|---|
| CN | 1237003 A | 12/1999 |
| CN | 1487621 A | 4/2004 |
| CN | 1543006 A | 11/2004 |
| CN | 1612405 A | 5/2005 |
| CN | 1650466 A | 8/2005 |
| CN | 1847155 A | 10/2006 |
| CN | 101170201 A | 4/2008 |
| EP | 1 150 374 A1 | 10/2001 |
| EP | 1 463 143 A2 | 9/2004 |
| EP | 1 508 934 A1 | 2/2005 |
| EP | 1 696 501 A1 | 8/2006 |
| EP | 1 742 281 A1 | 1/2007 |
| EP | 1 463 143 A3 | 4/2008 |

(Continued)

OTHER PUBLICATIONS

KIPO Office action dated Sep. 21, 2009, for priority Korean application 10-2007-0130804.
Patent Abstracts of Japan, Publication 10-069915, Published Mar. 10, 1998, for Kusumoto, et al.
Patent Abstracts of Japan, Publication 2003-173816, Published Jun. 20, 2003, for Yamada, et al.
Patent Abstracts of Japan, Publication 2006-107815, Published Apr. 20, 2006, for Kiyono.
Korean Patent Abstracts, Publication 1020060075966 A, Published Jul. 4, 2006, for Bae, et al.
KIPO Office action dated Jun. 25, 2010, for Korean Patent application 10-2008-0065442, 5 pages.
KIPO Office action dated Oct. 25, 2010, for Korean Patent application 10-2008-0065442, 5 pages.
SIPO Office action dated Apr. 21, 2011, for Chinese Patent application 200910140202.5, with English translation, 21 pages.

(Continued)

Primary Examiner — Laura Weiner
(74) Attorney, Agent, or Firm — Christie, Parker & Hale, LLP

(57) ABSTRACT

A lithium secondary battery includes a positive electrode, a negative electrode, a separator separating the positive electrode and the negative electrode, and an electrolyte. The negative electrode active material of the negative electrode includes a material that is capable of reversibly intercalating and deintercalating lithium ions and a metallic material capable of alloying with lithium. The electrolyte includes a chemical compound containing a nitrile (—CN) radical.

17 Claims, 1 Drawing Sheet

(56) References Cited

FOREIGN PATENT DOCUMENTS

| | | |
|---|---|---|
| EP | 2 108 640 A1 | 10/2009 |
| JP | 10-69915 | 3/1998 |
| JP | 10-247519 | 9/1998 |
| JP | 2003-173816 | 6/2003 |
| JP | 2003-197190 | 7/2003 |
| JP | 2005-505904 | 2/2005 |
| JP | 2005/066407 | 3/2005 |
| JP | 2006-107815 | 4/2006 |
| JP | 2006-245001 | 9/2006 |
| JP | 2008-108586 | 5/2008 |
| JP | 2008-235008 | 10/2008 |
| JP | 2009-158464 | 7/2009 |
| JP | 2009-527088 | 7/2009 |
| KR | 10-1990-0004058 | 3/1990 |
| KR | 10-2000-0073252 | 12/2000 |
| KR | 10-2000-0074691 | 12/2000 |
| KR | 10-2001-0098895 | 11/2001 |
| KR | 10-2001-0104150 | 11/2001 |
| KR | 10-2002-0029813 | 4/2002 |
| KR | 10-2003-0057321 | 7/2003 |
| KR | 10-2005-0075297 | 7/2005 |
| KR | 10-2005-0078443 | 8/2005 |
| KR | 10-2005-0089246 | 9/2005 |
| KR | 10-2005-0114698 | 12/2005 |
| KR | 10-2006-0035767 | 4/2006 |
| KR | 10-2006-0044919 | 5/2006 |
| KR | 10-2006-0060683 | 6/2006 |
| KR | 10-2006-0075966 | 7/2006 |
| KR | 10-2006-0114919 | 11/2006 |
| KR | 10-2007-0006253 | 1/2007 |
| KR | 10-2007-0075355 | 7/2007 |
| KR | 10-2007-0091938 | 9/2007 |
| KR | 10-0814827 B1 | 3/2008 |
| KR | 10-2008-0031151 | 4/2008 |
| KR | 10-2008-0037574 | 4/2008 |
| KR | 10-2009-0063441 | 6/2009 |
| TW | 200520276 | 6/2005 |
| WO | WO 97/35332 A1 | 9/1997 |
| WO | WO 98/15024 A1 | 4/1998 |
| WO | WO 03/032415 A2 | 4/2003 |
| WO | WO 03/075371 A2 | 9/2003 |
| WO | WO 2005/069423 A1 | 7/2005 |
| WO | WO 2007/081169 A1 | 7/2007 |
| WO | WO 2007/094625 A1 | 8/2007 |
| WO | WO 2007/094626 A1 | 8/2007 |
| WO | WO 2007/142121 A1 | 12/2007 |
| WO | WO 2008/093837 A1 | 8/2008 |

OTHER PUBLICATIONS

KIPO Office action dated Jun. 27, 2011, for Korean Patent application 10-2008-0065442, 5 pages.
Japanese Office action dated Nov. 29, 2011, for Japanese Patent application 2008-292467, 3 pages.
Patent Abstracts of Japan and English machine translation of Japanese Publication 2003-197190, 63 pages.
English machine translation of Japanese Publication 2005-066407, 11 pages.
Patent Abstracts of Japan and English machine translation of Japanese Publication 2009-158464, 56 pages.
Derwent Abstract and English machine translation of International application WO 03/075371, 14 pages.
U.S. Office action dated Jul. 12, 2011, for cross reference U.S. Appl. No. 11/876,999, 15 pages.
U.S. Office action dated Nov. 1, 2011, for cross reference U.S. Appl. No. 11/876,999, 12 pages.
U.S. Office action dated Feb. 13, 2012, for cross reference U.S. Appl. No. 11/876,999, 10 pages.
U.S. Office action dated Nov. 19, 2010, for cross reference U.S. Appl. No. 11/808,732, 17 pages.
U.S. Office action dated Mar. 24, 2011, for cross reference U.S. Appl. No. 11/808,732, 19 pages.
U.S. Office action dated Aug. 8, 2011, for cross reference U.S. Appl. No. 11/808,732, 20 pages.
U.S. Office action dated Apr. 21, 2011, for cross reference U.S. Appl. No. 12/223,950, 9 pages.
U.S. Office action dated Oct. 19, 2011, for cross reference U.S. Appl. No. 12/087,813, 8 pages.
U.S. Office action dated Jan. 26, 2012, for cross reference U.S. Appl. No. 12/458,219, 17 pages.
European Search Report dated Mar. 31, 2010 European Patent application 10250076.6, 6 pages.
KIPO Office action dated Aug. 29, 2011 for Korean Patent application 10-2009-0123992, (4 pages).
Int'l Search Report dated Apr. 20, 2007, and Written Opinion for Int'l Patent application PCT/KR2007/000214, (6 pages).
European Office action dated Jul. 27, 2012, for European Patent application 10250076.6, (3 pages).
U.S. Office action dated Jul. 2, 2012, for cross reference U.S. Appl. No. 12/580,995, (13 pages).
U.S. Office action dated Oct. 15, 2012, for cross reference U.S. Appl. No. 12/580,995, (11 pages).
SIPO Reexamination dated Feb. 5, 2013, for Chinese Patent application 200710181435.0, with English translation, (11 pages).
SIPO Reexamination Decision dated Apr. 11, 2013, with English translation, for Chinese Patent application 200710181435.0, (22 pages).

* cited by examiner

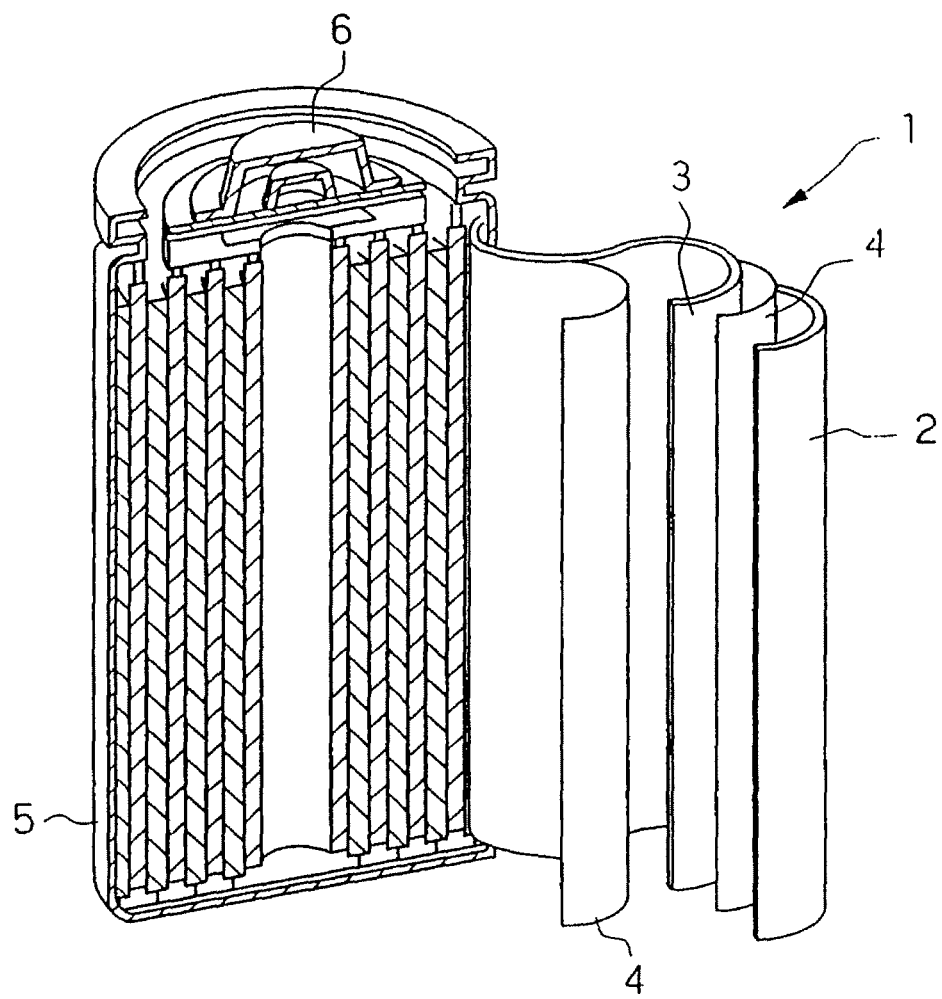

LITHIUM SECONDARY BATTERY

CROSS-REFERENCE TO RELATED APPLICATION

This application claims priority to and the benefit of Korean Patent Application No. 2007-130804, filed on Dec. 14, 2007, the entire content of which is hereby incorporated by reference.

BACKGROUND OF INVENTION

1. Field of the Invention

The present invention relates to lithium secondary batteries, and more particularly, electrolytes for use with lithium secondary batteries.

2. Description of the Related Art

Lithium metal has been used for negative electrode active materials. However, because of potential dangers of explosion created by the formation of dendrites and short circuits associated with the use of lithium metal, carbon group materials are more commonly used as negative electrode active materials.

The carbon group materials used in negative electrode active materials of lithium batteries typically include a crystalline carbon group, such as natural graphite, or artificial graphite, or a non-crystalline carbon group, such as soft carbon or hard carbon.

The non-crystalline carbon group typically has a large battery capacity, but it has a large irreversibility loss during the battery charge-discharge process. Similarly, the crystalline carbon group, such as graphite, has a high theoretical capacity (i.e. 372 mAh/g), but it still has problems with deterioration.

In addition, the current high theoretical capacities of the existing graphite and carbon group active materials are still not adequate for use in high capacity lithium batteries.

To address these problems, lithium batteries with metal composites have been proposed for use as negative electrode active materials. Examples of metal composite materials include aluminum, germanium, silicon, tin, zinc, lead, and so on.

These materials can be used to produce batteries with high capacity and energy density because the materials themselves have high capacity and high energy density. These metal composite materials can occlude and release lithium ions better than the conventional negative electrode active materials using carbon group materials. For example, pure silicon is reported to have a theoretical capacity as high as 4017 mAh/g.

However, inorganic particles, such as silicon or tin, when included in the negative electrode active material, can cause volume expansion of as much as 300 to 400%, which can become dangerous when the battery is exposed to high temperatures. Further, the inorganic particles can be problematic when lithium ions are released during the charging and discharge process. During this process the inorganic particles contract, thereby causing a volume change to occur and the negative electrode active material to be separated from the negative electrode collector. As a result, the conductivity between the negative electrode active material and the collector may decrease, thereby decreasing the battery capacity and cycle life.

SUMMARY OF THE INVENTION

In one embodiment, the present invention is directed toward an electrolyte containing a nitrile radical chemical compound for use in high capacity lithium secondary batteries. The nitrile radical in the electrolyte for high capacity secondary battery prevents volume expansion.

In one embodiment, the present invention provides a lithium secondary battery including a positive electrode with a positive electrode active material, a negative electrode with a negative electrode active material, a separator separating the positive electrode and the negative electrode, and an electrolyte. In an exemplary embodiment, the negative electrode active material includes a material that is capable of reversibly intercalating and deintercalating lithium ions and a metallic material capable of alloying with lithium, and the electrolyte includes a chemical compound containing a nitrile (—CN) radical.

In another embodiment, the present invention provides a lithium secondary battery having a battery capacity of 3000 mAh or more, which has an electrolyte containing a nitrile (—CN) radical.

In yet another embodiment, the present invention provides a lithium secondary battery having a battery capacity of 3000 mAh or more. The lithium secondary battery may further include a negative electrode having a negative electrode active material. The negative electrode active material includes a material that reversibly intercalates and deintercalates lithium ions and a metallic material capable of alloying with lithium.

In one embodiment, the metallic material that is capable of alloying with lithium includes at least one material selected from the group consisting of Al, Si, Sn, Pb, Zn, Bi, In, Mg, Ga, Cd and Ge.

In one embodiment, the material that is capable of reversibly intercalating and deintercalating lithium ions includes at least one material selected from the group consisting of artificial graphite, natural graphite, graphite-carbon fiber, graphite meso-carbon bead, and non-crystalline carbon.

In one embodiment, the chemical compound containing a nitrile radical is an aliphatic or an aromatic nitrile compound having 1 to 2 nitrile radicals. In another embodiment, the chemical compound containing a nitrile radical is a succinonitrile (SN).

In one embodiment, the chemical compound containing a nitrile radical is present in an amount ranging from 1 to 10 weight % based on the total weight of the electrolyte.

In one embodiment, the electrolyte further includes a substituted carbonate derivative. The substituted carbonate derivative includes a substituent selected from the group consisting of halogens, the cyano radical (CN), and the nitro radical ($NO_2$). In another embodiment, the additive is a fluoroethylene carbonate.

In one embodiment, the substituted carbonate derivative is present in an amount ranging from 0.1 to 30 weight % based on the total weight of the electrolyte.

BRIEF DESCRIPTION OF THE DRAWINGS

The invention will be described by the following description taken with the accompanying drawing in which:

FIG. 1 is a partially cutaway perspective view of a battery according to an embodiment of the present invention.

DETAILED DESCRIPTION OF THE INVENTION

The invention will now be described below, in which exemplary embodiments of the invention are shown.

In one embodiment, the present invention provides a secondary battery having excellent cycle life characteristics. The battery includes an electrolyte containing a non-aqueous organic solvent, a lithium salt, and an additive. The additive is a chemical compound containing a nitrile (—CN) radical to prevent volume expansion at high temperatures.

In one embodiment, the electrolyte includes a non-aqueous organic solvent. Nonlimiting examples of suitable non-aqueous solvents include carbonates, esters, ethers, and ketones. Nonlimiting examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Nonlimiting examples of esters include butyrolactone (BL), decanolide, valerolactone mevalonolactone, caprolactone, n-methyl acetate, n-ethyl acetate, n-propyl acetate and so on. Nonlimiting examples of ethers include dibutyl ether and so. Nonlimiting examples of ketones include polymethyl vinyl ketone. Although certain non-aqueous organic solvents are described, it is to be understood that the present invention is not restricted to the above described non-aqueous organic solvents.

In one embodiment, a mixture of a cyclic carbonate and a chain carbonate is used as the non-aqueous organic solvent. In one embodiment, the cyclic carbonate and chain carbonate are present in a volume ratio ranging from 1:1 to 1:9. In another embodiment, the cyclic carbonate and chain carbonate are present in a volume ratio ranging from 1:1.5 to 1:4.

In one embodiment, the electrolyte further includes an aromatic hydrocarbon organic solvent in addition to a carbonate group solvent. Nonlimiting examples of suitable aromatic hydrocarbon organic solvents include benzene, fluorobenzene, chlorobenzene, nitrobenzene, toluene fluorotoluene, trifluorotoluene, and xylene. In one embodiment, the electrolyte contains a mixture of a carbonate group solvent and an aromatic hydrocarbon organic solvent, present in a volume ratio ranging from 1:1 to 30:1.

In one embodiment, the electrolyte includes a lithium salt, which drives the operation of the lithium battery by providing a lithium ion source. Nonlimiting examples of suitable lithium salts include $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (where x and y are natural numbers), and $LiSO_3CF_3$.

In some embodiments, the concentration of lithium salt ranges from 0.6 M to 2.0 M or, more specifically, from 0.7 M to 1.6 M. If the concentration of the lithium salt is below 0.6 M, both the conductivity and lithium ion transporting function of the electrolyte may be decreased. If concentration of the lithium salt is above 2.0 M, the viscosity of the electrolyte increases, thereby reducing the mobility of the lithium ions.

Accordingly, in certain embodiments, the electrolyte includes a chemical compound containing a nitrile radical as an additive.

Generally, additives are not used in batteries. However, some additives are added to enhance battery performance characteristics, such as cycle life, high discharge rate at low temperatures, stability at high temperatures, overcharge prevention, and high-temperature swelling characteristics. In one embodiment, an additive is used to improve the high-temperature swelling characteristic by suppressing volume expansion of the high capacity negative electrode active material, and to enhance the cycle life.

In one embodiment, the additive is a chemical compound having a nitrile radical, which may either be an aliphatic or an aromatic nitrile compound. In another embodiment, the additive is a chemical compound having 1 to 2 nitrile radicals. In still another embodiment, the additive is an aliphatic dinitrile containing 2 nitrile radicals.

The aliphatic dinitrile compound may be a cyclic-type or a branch-type dinitrile chemical compound with 1 to 12 carbon(s) and one or more substituents. Nonlimiting examples of suitable dinitrile chemical compounds include succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimetyhyl-2, 5-hexanedicarbonitrile, 2,6-dicyanoheptane, 2,7-dicyanooctane, 2,8-dicyanononane, and 1,6-dicyanodecane. In one embodiment, the dinitrile chemical compound is succinonitrile (SN).

In one embodiment, the additive content of the chemical compound containing nitrile radical is present in an amount of from 1 to 10 weight % based on the total weight of the electrolyte.

If the additive content is below 1 weight %, there is little improvement in the high-temperature swelling characteristics. If the additive content is above 11 weight %, the cycle life characteristics may deteriorate.

In one embodiment, the electrolyte further includes an additive that is a substituted carbonate derivative. Nonlimiting examples of suitable substituents of the substituted carbonate derivative include halogens, the cyano radical (CN), and the nitro radical ($NO_2$). If the substituted carbonate derivative additive is added, the electrochemical characteristics of the batteries, such as swelling, battery capacity, cycle life, high rate discharge at low temperature characteristic, etc. may improve. In one embodiment, a carbonate derivative additive such as ethylene carbonate of chemical Formula I below is used.

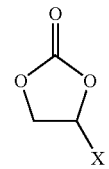

Formula 1 where, X is selected from the group consisting of halogens, the cyano radical (CN), and the nitro radical ($NO_2$). In another embodiment, fluoroethylene carbonate is used as the additive.

In one embodiment, the substituted carbonate derivative is present in an amount of from 0.1 to 30 weight % based on to the total weight of the electrolyte. If the content is below 0.1 weight %, there is little improvement in the high-temperature swelling characteristics. If the content is above 30 weight %, high temperature cycle life may deteriorate and swelling problems may occur.

Referring to FIG. 1, in one embodiment, a lithium secondary battery 1 is provided that includes a positive electrode 3 and a negative electrode 2 with a separator 4 positioned between the two. The positive electrode 3, the negative electrode 2, and the separator 4 are wound together to form an electrode assembly which is enclosed within a battery case along with an electrolyte, and sealed with a cap assembly 6.

The positive electrode includes a positive electrode active material that enables lithium ions to intercalate and deintercalate reversibly. Nonlimiting examples of positive electrode active materials include lithium-transitional metal oxides, such as $LiCoO_2$, $LiNiO_2$, $LiMnO_2$ or $LiNi_{1-x-y}Co_xM_yO_2$ (where $0 \le x \le 1$, $0 \le y \le 1$, $0 \le x \le 1$, $0 \le x+y \le 1$, M is a metal such as Al, Sr, Mg, La), and so on.

The negative electrode may include a metallic composite as the negative electrode active material, which is capable of reversibly intercalating and deintercalating lithium ions.

Negative electrode active materials that contain metallic composites generally have higher energy density, as well as higher capacity to occlude and release lithium ions than negative electrode active materials that contain only carbon group materials. Accordingly, batteries that have a metallic composite as a negative electrode active material may have higher capacity and energy density.

In one embodiment, the negative electrode active material contains a material that enables lithium ions to intercalate and deintercalate reversibly, and a metallic material capable of alloying with lithium.

Examples of suitable materials that enable lithium ions to intercalate and deintercalate reversibly include, but are not limited to, artificial graphite, natural graphite, graphite-carbon fiber, graphite meso-carbon bead, and non-crystalline carbon. Examples of suitable metallic materials capable of alloying with lithium include, but are not limited to, Al, Si, Sn, Pb, Zn, Bi, In, Mg, Ga, Cd, and Ge.

In various embodiments, the aforementioned metallic materials can also reversibly charge and discharge lithium ions, similar to the carbon group materials, so that the capacity and energy density can be improved. At the same time, these metallic materials enable batteries to have higher capability of intercalating and deintercalating lithium ions than conventional batteries that use only carbon group materials as a negative electrode active material.

However, the negative electrode active materials having metallic composites may have problems of volume expansion due to particles, such as silicon or tin, contained in the negative electrode active materials. In one embodiment, the volume expansion can be as much as approximately 300 to 400% of the original volume, due to intercalating lithium ions during the charging process. The volume expansion problem is further exacerbated at high temperatures.

Accordingly, a nitrile contained chemical compound is included in the electrolyte in order to improve the high-temperature swelling characteristics by suppressing the volume expansion of the metallic active materials.

The strong polarity of the nitrile radical in the nitrile contained chemical compound masks active sites at the electrode surface and thereby tends to reduce the exothermic heat generated by the volume change of the active material as the active material reacts with the electrolytes during the charge- and discharge process. Consequently, volume expansion is suppressed even when the battery operates at high temperatures.

The electrode according to the present invention can be prepared by commonly known methods in the field. In one exemplary embodiment, the electrode is made by spreading a positive electrode slurry and a negative electrode slurry on a metallic film current collector, followed by rolling and drying the metallic film.

The positive electrode slurry and the negative electrode slurry can be made by mixing the positive electrode active material and the negative electrode active material, respectively, with a settling agent and a dispersing agent. In one embodiment, a small amount of a conductive material is added to the positive electrode slurry and the negative electrode slurry.

Any conductive material that does not cause a chemical reaction in the battery may be used as the conductive material. Nonlimiting examples of suitable conductive materials include carbon black, such as acetylene black, ketjen black, farness black, thermal black, natural graphite, artificial graphite, and conductive carbon fibers.

For settling agents, any thermoplastic resin, thermosetting resin, or combinations of them can be used. Examples include polyvilylidenfluoride (PVDF) and polytetrafluoroethylene (PTFE), and in particular, PVDF is preferred.

An aqueous dispersing agent or an organic dispersing agent such as N-methyl-2 pyrrolidone (NMP) can be used for the dispersing agent.

The lithium secondary battery of the present invention can be manufactured by any method known in the field, for example, by inserting a porous separator film between the positive electrode and the negative electrode, and including an electrolyte containing the above described additives.

Porous separator films may be used for the separator films. Nonlimiting examples of suitable porous separator films include polypropylene, polyethylene, and polyolefin films.

The lithium secondary battery manufactured by the method described above may be made in different shapes and sizes. Examples include cylindrical, square, or pouch shapes.

Described below are certain exemplary embodiments of the present invention, including a comparative example.

EXAMPLE 1

$LiCoO_2$, PVDF as a binder, and carbon as a conductive material were mixed in a weight ratio of 92:4:4 and dispersed in NMP to form a positive electrode slurry. The positive electrode was manufactured by drying and rolling a 20 μm thick aluminum foil coated with the positive electrode slurry. A silicon and graphite composite was mixed with styrene-butadiene rubber as a binder, and carboxymethylcellulose as a viscosity enhancing material, in weight ratio of 96:2:2 and dispersed in water to form a negative electrode slurry. The negative electrode was manufactured by drying and rolling a 15 μm thick copper foil coated with the negative electrode slurry.

A 20 μm thick separator comprising polyethylene was inserted between the manufactured electrodes, wound, pressed, and inserted into a cylindrical can.

A lithium secondary battery was then made by pouring an electrolyte into the cylindrical can. In preparing the electrolyte, a 1.3 M solution of $LiPF_6$ was provided in a mixed solvent containing ethylene carbonate, diethyl carbonate, and fluoroethylene carbonate (FEC) mixed in a 2:6:2 volume ratio. This solution was then mixed with 1 weight % succinonitrile (SN) as an additive, and an additional 20 weight % of FEC to produce the electrolyte.

EXAMPLE 2

Example 2 was prepared in the same way as described in example 1 except for adding 2 weight % of SN in lieu of 1 weight %.

EXAMPLE 3

Example 3 was prepared in the same way as described in example 1 except for adding 5 weight % of SN in lieu of 1 weight %.

EXAMPLE 4

Example 4 was prepared in the same way as described in example 1 except for adding 10 weight % of SN in lieu of 1 weight %.

EXAMPLE 5

Example 5 was prepared in the same way as described in example 1 except for adding 10 weight % of FEC in lieu of 20 weight % and adding 2 weight % of SN in lieu of 1 weight %.

EXAMPLE 6

Example 6 was prepared in the same way as described in example 1 except for adding 30 weight % of FEC in lieu of 20 weight % and adding 2 weight % of SN in lieu of 1 weight %.

COMPARATIVE EXAMPLE 1

Comparative example 1 was prepared in the same way as described in example 1 except that SN not added.

COMPARATIVE EXAMPLE 2

Comparative example 2 was prepared in the same way as described in example 5 except that SN was not added.

COMPARATIVE EXAMPLE 3

Comparative example 3 was prepared in the same way as described in example 6 except SN was not added.

COMPARATIVE EXAMPLE 4

Comparative example 4 was prepared in the same way as described in example 1 except for adding 11 weight % of SN.

The capacity of each lithium battery of examples 1 through 6 and comparative examples 1 through 4 was measured after cut-off charging the battery at 4.35V, 0.05 C, and CC/CV (constant current/constant voltage), with a 0.8 C charge-discharge rate and cut-off discharging the battery at 3.0V for 100 cycles at a 1 C charge-discharge rate. At the $100^{th}$ cycle, the capacity maintenance rate (%) of each battery was measured.

Each battery included a current interrupt device (CID). The CID is a device that senses pressure change inside a sealed battery container. As the pressure inside the battery container increases and reaches a set pressure, the CID activates by cutting off the current.

The CID operation starting point of each lithium battery of examples 1 through 6, and comparative examples 1 through 4 was measured after charging the battery at 4.35V CC/CV with 0.5 C charge-discharge rate and leaving the battery in a chamber at 90° C. for 60 hours.

The measured results are shown below in Table 1.

First, the results of Table 1 demonstrate that the secondary batteries of examples 1 through 6 and comparative examples 1 through 4 have a high capacity (i.e. 3000 mAh or more) because these batteries contain a metal composite negative electrode active material.

Second, the CID operation starting point data of examples 1 through 6, which electrolytes contain the nitrile containing chemical compound SN, show that none of the CIDs operated, or was set off, except for example 1, which was set off after 28 hours. In contrast, comparative examples 1 through 3, which do not contain SN, show that the CID was set off after only 4 hours or 6 hours.

Accordingly, high-temperature swelling characteristics were shown to be improved by suppressing volume expansion of the metallic group negative electrode active material, even when the negative electrode active material of metallic composite is used in high capacity batteries and exposed to high temperatures. This is achieved by including a nitrile radical containing chemical compound (SN) in the electrolyte Still referring to Table 1, comparative example 4, which contains 11 weight % nitrile radical containing chemical compound (SN) in the electrolyte, shows improvements in high-temperature swelling characteristics in that the CID did not operate. However, the cycle life at the $100^{th}$ cycle dropped to 52%.

Accordingly, it is preferable to add a chemical compound containing a nitrile radical at a lower concentration of from 1 to 10 weight % with respect to the total weight of the electrolyte.

Described below are comparative examples using conventional graphite groups for the negative electrode active material instead of the metallic active material.

COMPARATIVE EXAMPLE 5

$LiCoO_2$, PVDF as a binder, and carbon as a conductive material were mixed in a weight ratio of 92:4:4 and dispersed in NMP to form a positive electrode slurry. A positive electrode was prepared by drying and rolling a 20 μm thick aluminum foil coated with the positive electrode slurry. Graphite active material as a negative electrode active material, styrene-butadiene rubber as a binder, and carboxymethylcellulose as a viscosity enhancing material were mixed in a weight ratio of 96:2:2 and dispersed in water to form a negative electrode slurry. A negative electrode was prepared by drying and rolling a 50 μm thick copper foil coated with the negative electrode slurry.

A 20 μm thick separator comprising polyethylene was inserted between the manufactured electrodes, wound, pressed, and inserted into a cylindrical can.

TABLE 1

| classification | FEC (weight %) | SN (weight %) | CID operation starting point | capacity maintenance rate (%) | battery capacity (mAh) |
| --- | --- | --- | --- | --- | --- |
| example 1 | 20 | 1 | operate after 28 hours | 73 | 3031 |
| example 2 | 20 | 2 | do not operate | 73 | 3026 |
| example 3 | 20 | 5 | do not operate | 70 | 3030 |
| example 4 | 20 | 10 | do not operate | 66 | 3029 |
| example 5 | 10 | 2 | do not operate | 70 | 3035 |
| example 6 | 30 | 2 | do not operate | 75 | 3024 |
| *example 1 | 20 | 0 | operate after 4 hours | 73 | 3028 |
| *example 2 | 10 | 0 | operate after 6 hours | 70 | 3032 |
| *example 3 | 30 | 0 | operate after 4 hours | 75 | 3026 |
| *example 4 | 20 | 11 | do not operate | 52 | 3029 |

(*refers to comparative example)

A lithium secondary battery was manufactured by pouring an electrolyte into the cylindrical can. The electrolyte was prepared according to the electrolyte of Example 1.

COMPARATIVE EXAMPLE 6

Comparative example 6 was prepared in the same way as described in comparative example 5 except for adding 2 weight % of SN in lieu of 1 weight %.

COMPARATIVE EXAMPLE 7

Comparative example 7 was prepared in the same way as described in comparative example 5 except for adding 5 weight % of SN in lieu of 1 weight %.

COMPARATIVE EXAMPLE 8

Comparative example 8 was prepared in the same way as described in comparative example 5 except that SN was not added.

The capacity of each lithium battery of comparative examples 5 through 8 was measured after charging the battery at a 4.35V, 0.05 C, and CC/CV, with a 0.8 C charge-discharge rate.

The time taken for the current interrupt device (CID) to set off or CID operation starting point of each lithium battery capacity of comparative examples 5 through 8 was measured after charging the battery by 4.35V CC/CV with 0.5 C charge-discharge rate and leaving the battery in a chamber at 90° C. for 60 hours.

The measured results are shown below in Table 2.

TABLE 2

| classification | FEC (weight %) | SN (weight %) | CID operation starting point | battery capacity(mAh) |
|---|---|---|---|---|
| *example 5 | 20 | 1 | do not operate | 2691 |
| *example 6 | 20 | 2 | do not operate | 2688 |
| *example 7 | 20 | 5 | do not operate | 2690 |
| *example 8 | 20 | 0 | do not operate | 2685 |

(*refers to comparative example)

First, the results of Table 2 demonstrate that the secondary batteries of comparative examples 5 through 8 have a low capacity (i.e. lower than 3000 mAh) because graphite was used as a negative electrode active material.

Second, the CID results demonstrate that the CID is not set off regardless of the types of electrolytes (e.g. having or not having a nitrile-containing chemical CN) when a conventional graphite was used as a negative electrode active material instead of a metallic active material.

The results from Table 1 and Table 2, demonstrate that the nitrile radical containing chemical compound is effective in suppressing volume expansion if the battery uses a metallic group negative electrode active material. Such a material improves high-temperature swelling characteristics by suppressing volume expansion of the metallic group. The CID operation is independent of the presence of an additive containing the nitrile compound (i.e. SN) if the battery employs a conventional graphite negative electrode active material.

Accordingly, an embodiment of the present invention provides an electrolyte for lithium secondary batteries and secondary lithium batteries, which enables the batteries to have improved high-temperature swelling characteristics, excellent cycle life, and/or high capacity (i.e. 3000 mAh or more) by adding a chemical compound containing a nitrile radical at a concentration of from 1 to 10 weight % based on the total weight of the electrolyte.

While the present invention has been particularly described with reference to certain exemplary embodiments, it is to be understood by those of ordinary skill in the art that various changes in forms and compositions may be made without departing from the spirit and scope of the present invention.

What is claimed is:

1. A lithium secondary battery comprising:
a positive electrode including a positive electrode active material;
a negative electrode including a negative electrode active material comprising a material capable of reversibly intercalating and deintercalating lithium ions, and a metallic material capable of alloying with lithium;
a separator separating the positive electrode and the negative electrode; and
an electrolyte comprising a solvent, a first additive comprising a chemical compound containing a nitrile (—CN) radical, the chemical compound containing a nitrile (—CN) radical being present in the electrolyte in a concentration of 1 to 10 weight % based on the total weight of the electrolyte, and a second additive comprising a substituted carbonate derivative represented by Formula 1, the second additive being present in the electrolyte in an amount of about 20 to about 30wt % based on the total weight of the electrolyte:

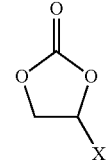

Formula 1 wherein X is selected from the group consisting of halogens, cyano radicals (—CN), and nitro radicals (—NO$_2$).

2. The lithium secondary battery of claim 1, wherein the metallic material capable of alloying with lithium is selected from the group consisting of Al, Si, Sn, Pb, Zn, Bi, In, Mg, Ga, Cd, Ge, and mixtures thereof.

3. The lithium secondary battery of claim 1, wherein the material capable of reversibly intercalating and deintercalating lithium is selected from the group consisting of artificial graphite, natural graphite, graphite-carbon fiber, graphite meso-carbon bead, non-crystalline carbon, and mixtures thereof.

4. The lithium secondary battery of claim 1, wherein the chemical compound containing a nitrile radical is an aliphatic or an aromatic nitrile compound having 1 to 2 nitrile radicals.

5. The lithium secondary battery of claim 1, wherein the chemical compound containing a nitrile radical is an aromatic or aliphatic dinitrile chemical compound.

6. The lithium secondary battery of claim 5, wherein the aromatic or aliphatic dinitrile chemical compound is selected from the group consisting of succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexanedicarbonitrile, 2,6- dicyanoheptane, 2,7-dicyanooctane, 2,8-dicyanononane, 1,6-dicyanodecane, and mixtures thereof.

7. The lithium secondary battery of claim 1, wherein the chemical compound containing a nitrile radical is succinonitrile.

8. The lithium secondary battery of claim 1, wherein the substituted carbonate derivative is a fluoroethylene carbonate.

9. A lithium secondary battery comprising an electrolyte including a first additive comprising a chemical compound containing a nitrile (CN) radical, the chemical compound containing a nitrile (CN) radical being present in the electrolyte in a concentration of 1 to 10 weight % based on the total weight of the electrolyte, and a second additive comprising a substituted carbonate derivative represented by Formula 1, the second additive being present in the electrolyte in an amount of about 20 to about 30wt % based on the total weight of the electrolyte:

Formula 1

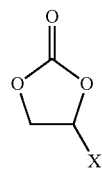

wherein X is selected from the group consisting of halogens, cyano radicals (—CN), and nitro radicals (—NO$_2$).

10. The lithium secondary battery of claim 9, further comprising a negative electrode active material comprising a material capable of reversibly intercalating and deintercalating lithium ions, and a metallic material capable of alloying with lithium.

11. The lithium secondary battery of claim 10, wherein the metallic material capable of alloying with lithium is selected from the group consisting of Al, Si, Sn, Pb, Zn, Bi, In, Mg, Ga, Cd, Ge, and combinations thereof.

12. The lithium secondary battery of claim 10, wherein the material capable of reversibly intercalating and deintercalating lithium ions is selected from the group consisting of artificial graphite, natural graphite, graphite-carbon fiber, graphite meso-carbon bead, and non-crystalline carbon.

13. The lithium secondary battery of claim 9, wherein the chemical compound containing a nitrile radical is an aliphatic or aromatic nitrile compound having 1 to 2 nitrile radicals.

14. The lithium secondary battery of claim 9, wherein the chemical compound containing a nitrile radical is an aromatic or aliphatic dinitrile chemical compound.

15. The lithium secondary battery of claim 14, wherein the aromatic or aliphatic dinitrile chemical compound is selected from the group consisting of succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, and mixtures thereof.

16. The lithium secondary battery of claim 9, wherein the chemical compound containing a nitrile radical is succinonitrile.

17. The lithium secondary battery of claim 9, wherein the substituted carbonate derivative is a fluoroethylene carbonate.

\* \* \* \* \*

UNITED STATES PATENT AND TRADEMARK OFFICE
CERTIFICATE OF CORRECTION

PATENT NO. : 8,815,454 B2
APPLICATION NO. : 12/334337
DATED : August 26, 2014
INVENTOR(S) : Yong-Shik Kim et al.

It is certified that error appears in the above-identified patent and that said Letters Patent is hereby corrected as shown below:

In the Claims

Col. 11, line 11, Claim 9    Delete "(CN)",

Insert --(-CN)--

Col. 11, line 12, Claim 9    Delete "(CN)",

Insert --(-CN)--

Signed and Sealed this
Sixteenth Day of August, 2016

Michelle K. Lee
*Director of the United States Patent and Trademark Office*